(12) United States Patent
Hahn

(10) Patent No.: US 7,381,124 B1
(45) Date of Patent: Jun. 3, 2008

(54) STARWHEEL ASSEMBLY FOR USE WITH CARCASS DEHAIRING MACHINES

(76) Inventor: Nicholas R. Hahn, 17363 Wood Drift Dr., West Olive, MI (US) 49460

( * ) Notice: Subject to any disclaimer, the term of this patent is extended or adjusted under 35 U.S.C. 154(b) by 92 days.

(21) Appl. No.: 11/527,261

(22) Filed: Sep. 26, 2006

(51) Int. Cl.
*A22B 5/08* (2006.01)
(52) U.S. Cl. ........................................... 452/97
(58) Field of Classification Search ............ 452/93–97, 452/104
See application file for complete search history.

(56) References Cited

U.S. PATENT DOCUMENTS

| | | | |
|---|---|---|---|
| 1,213,717 A | 1/1917 | Wenzel | |
| 1,460,863 A | 7/1923 | Pratt | |
| 1,502,749 A | 7/1924 | Schmidt | |
| 2,029,064 A | 1/1936 | Edwards | |
| 2,296,873 A * | 9/1942 | Rachford | 452/97 |
| 2,604,656 A | 7/1952 | Anderson et al. | |
| 2,758,334 A | 8/1956 | Adams, Jr. et al. | |
| 4,570,297 A | 2/1986 | Nijhuis | |
| 4,907,317 A | 3/1990 | Radovic et al. | |
| 5,049,109 A | 9/1991 | Radovic et al. | |
| 5,569,066 A * | 10/1996 | Meier et al. | 452/93 |

* cited by examiner

*Primary Examiner*—Thomas Price
(74) *Attorney, Agent, or Firm*—The Watson IP Group PLC; Jovan N. Jovanovic; Vladan M. Udsiljevic

(57) ABSTRACT

A starwheel assembly for use with a carcass dehairing machine comprising a starwheel having a central hub and at least one paddle deflection limiting member, as well as a scraper paddle. The central hub includes an arcuate body having an outer surface and an inner surface. Each paddle deflection limiting member includes a proximal end coupled to the outer surface of the body of the central hub and a distal end opposing the proximal end. A paddle attachment assembly facilitates attachment of the scraper paddle thereto. The configuration of the starwheel apparatus provides support for the scraper paddle and limits the movement thereof.

20 Claims, 5 Drawing Sheets

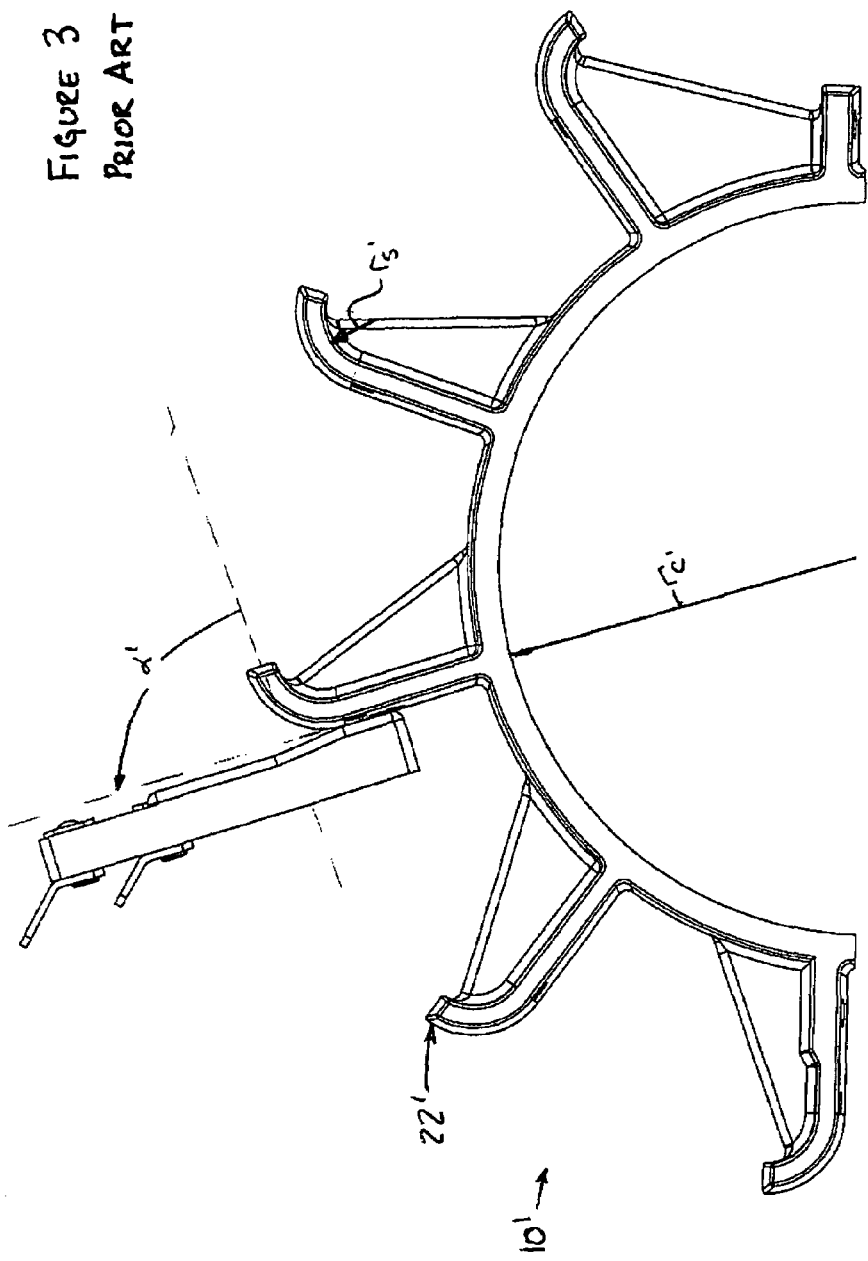

STARWHEEL ASSEMBLY FOR USE WITH CARCASS DEHAIRING MACHINES

BACKGROUND OF THE INVENTION

1. Field of the Invention

The invention relates in general to carcass dehairing equipment, and more particularly, to a starwheel assembly for use with carcass dehairing machines.

2. Background Art

The use of automated carcass dehairing equipment is well known in the art. For decades, the primary dehairing equipment has employed starwheels having scraper paddles that rotate and impact the carcass. The scraper paddles include blades which contact the skin and dislodge and remove hair follicles from the carcass. Examples of starwheels and various scraper paddle configurations are shown in the following U.S. patents, namely, U.S. Pat. No. 1,502,749 issued to Schmidt, U.S. Pat. No. 1,460,863 issued to Pratt, U.S. Pat. No. 2,029,064 issued to Edwards, U.S. Pat. No. 2,296,873 issued to Rachford, U.S. Pat. No. 2,604,656 issued to Anderson et al, U.S. Pat. No. 2,758,334 issued to Adams, Jr., et al, U.S. Pat. No. 4,570,297 issued to Nijhuis, U.S. Pat. No. 5,049,109 issued to Radovic et al, and U.S. Pat. No. 5,569,066 issued to Meier et al.

Over the last few decades, many meat processing plants have been utilizing starwheels 10' of the type shown in FIGS. 1 and 3. Such starwheels include paddle attachment members 22' that include an arcuate region to provide a soft edge about which the paddle member can bend. Moreover, the arcuate region of the paddle attachment members typically have a relatively small radius of curvature, $r_s'$ (FIG. 3). As such, certain problems and drawbacks have emerged.

In particular, due to the relatively small radius of curvature, the scraper paddles are exposed to large rotational moments and rotational stresses about a central region of the body. Such extensive bending and rotation exposes the scraper paddles to large and damaging strain forces. Moreover, much of the scraper paddle remains unsupported as the scraper paddle rotates relative to the arcuate region even in a fully displaced configuration. Accordingly, the usable life of the scraper paddles is limited and the scraper paddles degrade relatively quickly.

Thus, it is an object of the present invention to enhance the usable life of scraper paddles attached to starwheels.

It is another object of the present invention to provide a starwheel which has an improved support structure for a scraper paddle.

It is another object of the invention to provide a starwheel which limits the rotational displacement of a scraper paddle coupled thereto.

These objects as well as other objects of the present invention will become apparent in light of the present specification, claims, and drawings.

SUMMARY OF THE INVENTION

The invention is directed to a starwheel apparatus for use with a carcass dehairing machine comprising a central hub and at least one paddle deflection limiting member. The central hub includes an arcuate body having an outer surface and an inner surface. Each paddle deflection limiting member includes a proximal end coupled to the outer surface of the body of the central hub and a distal end opposing the proximal end. A deflection limiting region is defined approaching the distal end. A paddle attachment assembly facilitates attachment of a scraper paddle thereto. The portion of the at least one paddle deflection limiting member that extends between the paddle attachment assembly and the deflection limiting region comprises an arcuate configuration which is at least 50% of the length of a scraper paddle attached thereto, or larger.

In a preferred embodiment, the arcuate body comprises a substantially circular member having an arcuate distance of 360°. The at least one paddle deflection limiting member comprises ten paddle deflection limiting members disposed substantially equidistantly about the outside surface of the arcuate body. In another preferred embodiment, the arcuate body is separable into two components, each having an arcuate distance of approximately 180°.

Preferably, the at least one paddle deflection limiting member further comprises a substantially planar outer surface between the paddle attachment assembly and the proximal end.

In a preferred embodiment, the at least one paddle deflection limiting member further comprises a substantially continuous arcuate configuration extending substantially from the paddle attachment assembly to the distal end thereof.

In another preferred embodiment, a line tangent to the paddle deflection limiting member proximate the deflection limiting region is angled at an angle $\alpha$ of between 15° and 60° relative to a line tangent to the paddle deflection limiting member proximate the paddle attachment assembly thereof.

In another preferred embodiment, less than a 40% of the length of a scraper paddle beyond the paddle attachment assembly extends beyond the distal end of the at least one paddle deflection limiting member.

In a preferred embodiment, the at least one paddle deflection limiting member includes an arcuate configuration having a radius of curvature which is at least 45% that of the radius of curvature of the arcuate body of the central hub. Preferably, the radius of curvature is greater than 67% (or even larger than) that of the central hub.

In another aspect of the invention, the invention comprises a starwheel apparatus for use in association with a carcass dehairing machine. The invention comprises a central hub and at least one paddle deflection limiting member. The central hub includes an arcuate body having an outer surface and an inner surface. Each paddle deflection limiting member includes a proximal end coupled to the outer surface of the body of the central hub and a distal end opposing the proximal end. A paddle deflection limiting region is defined proximate the distal end. A paddle attachment assembly facilitates attachment of a scraper paddle thereto. A line tangent to the paddle deflection limiting member proximate the deflection limiting region thereof is angled at an angle $\alpha$ of between 15° and 60° relative to a line tangent to the paddle deflection limiting member proximate the paddle attachment assembly.

In another aspect of the invention, the invention comprises a system for use with carcass dehairing machines. The system comprises a starwheel apparatus comprises a central hub and at least one paddle deflection limiting member. The central hub includes an arcuate body with an outer surface and an inner surface. The at lease one paddle deflection limiting member has a proximal end coupled to the outer surface of the body of the central hub, a distal end opposing the proximal end, a deflection limiting region approaching the distal end, and a paddle attachment assembly associated therewith. The scraper paddle is coupled to each of the at least one paddle deflection limiting member by way of the paddle attachment assembly. The scraper paddle is sized so as to extend beyond the deflection limiting region of the at least one paddle deflection limiting member. The at least one paddle deflection limiting member and the scraper paddle are structurally configured such that the deflection limiting region more than 3.5" inches beyond the attachment assembly of the paddle deflection limiting member beyond the attachment interface thereof.

In one embodiment, the scraper paddle is greater than 8" in length.

In another preferred embodiment, the ratio of the length of the scraper paddle extending beyond the paddle attachment assembly and the distance between the paddle attachment assembly and the deflection limiting region is less than 2.4.

BRIEF DESCRIPTION OF THE DRAWINGS

The invention will now be described with reference to the drawings wherein:

FIG. 3 of the drawings is a side elevational view of a prior art starwheel assembly of FIG. 1;

DETAILED DESCRIPTION OF THE INVENTION

Figure 2:
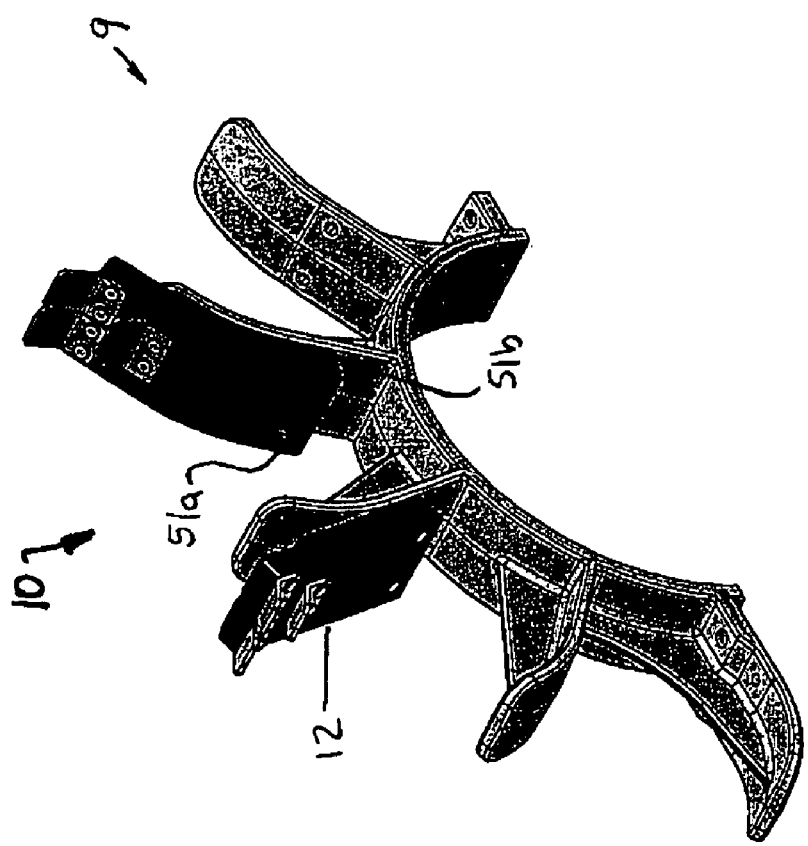
FIG. 2 of the drawings is a perspective view of a starwheel assembly of the present invention showing a scraper paddle positioned upon two of the paddle deflection limiting members.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 4:
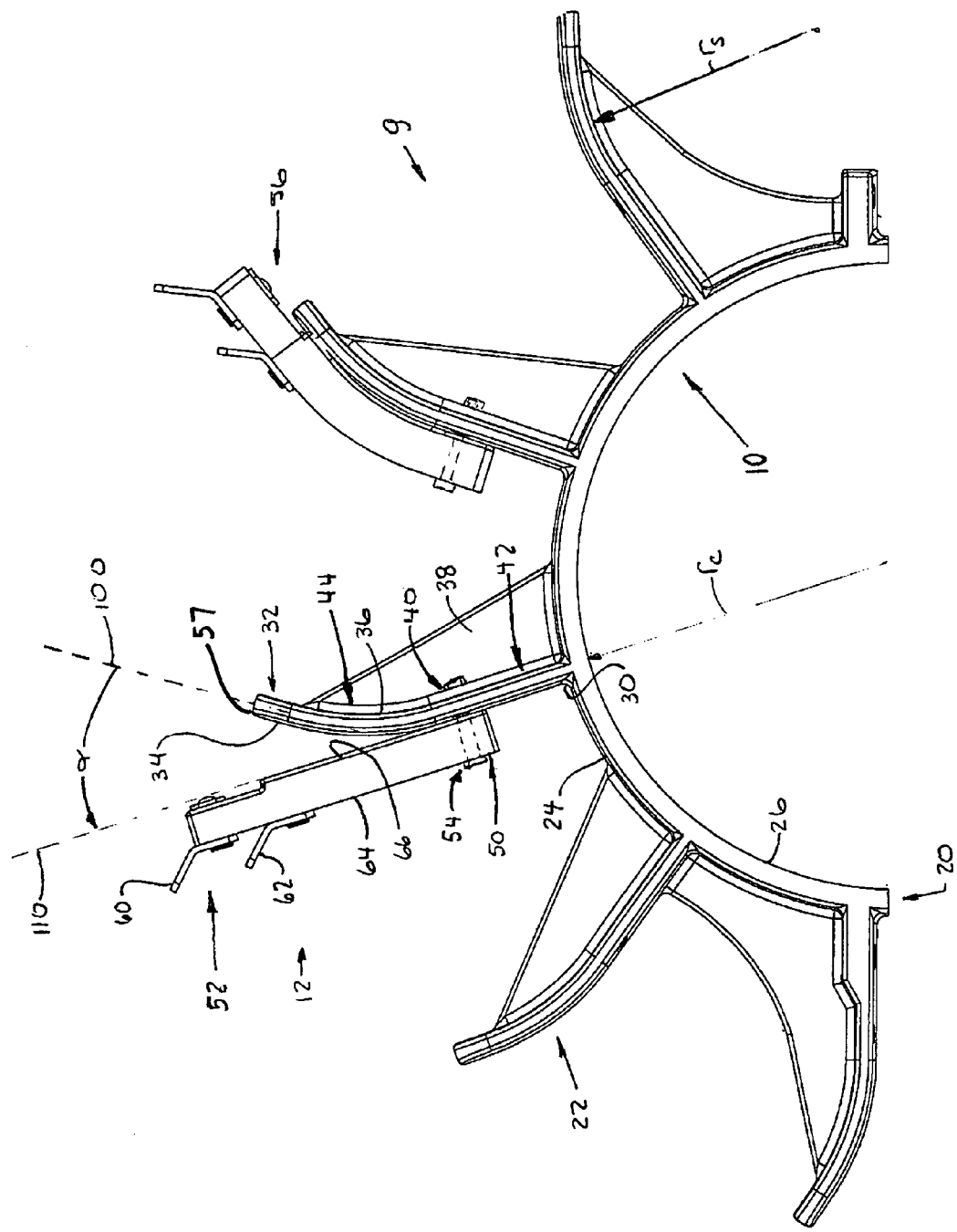
FIG. 4 of the drawings is a side elevational view of the starwheel assembly of FIG. 2.

Referring now to the drawings and in particular to FIGS. 2 and 4, starwheel assembly 9 for use with a carcass dehairing machine (not shown) is disclosed as comprising starwheel 10 and scraper paddles, such as scraper paddle 12. As will be understood the starwheel is mounted (via fasteners) on a rotating drum which coacts with a carcass to remove hair from the carcass. Typically, multiple starwheel assemblies 9 will be positioned along the length of the drum. Of course, the invention is not limited to use in association with any particular drum or particular dehairing machine model or manufacturer.

Figure 5:
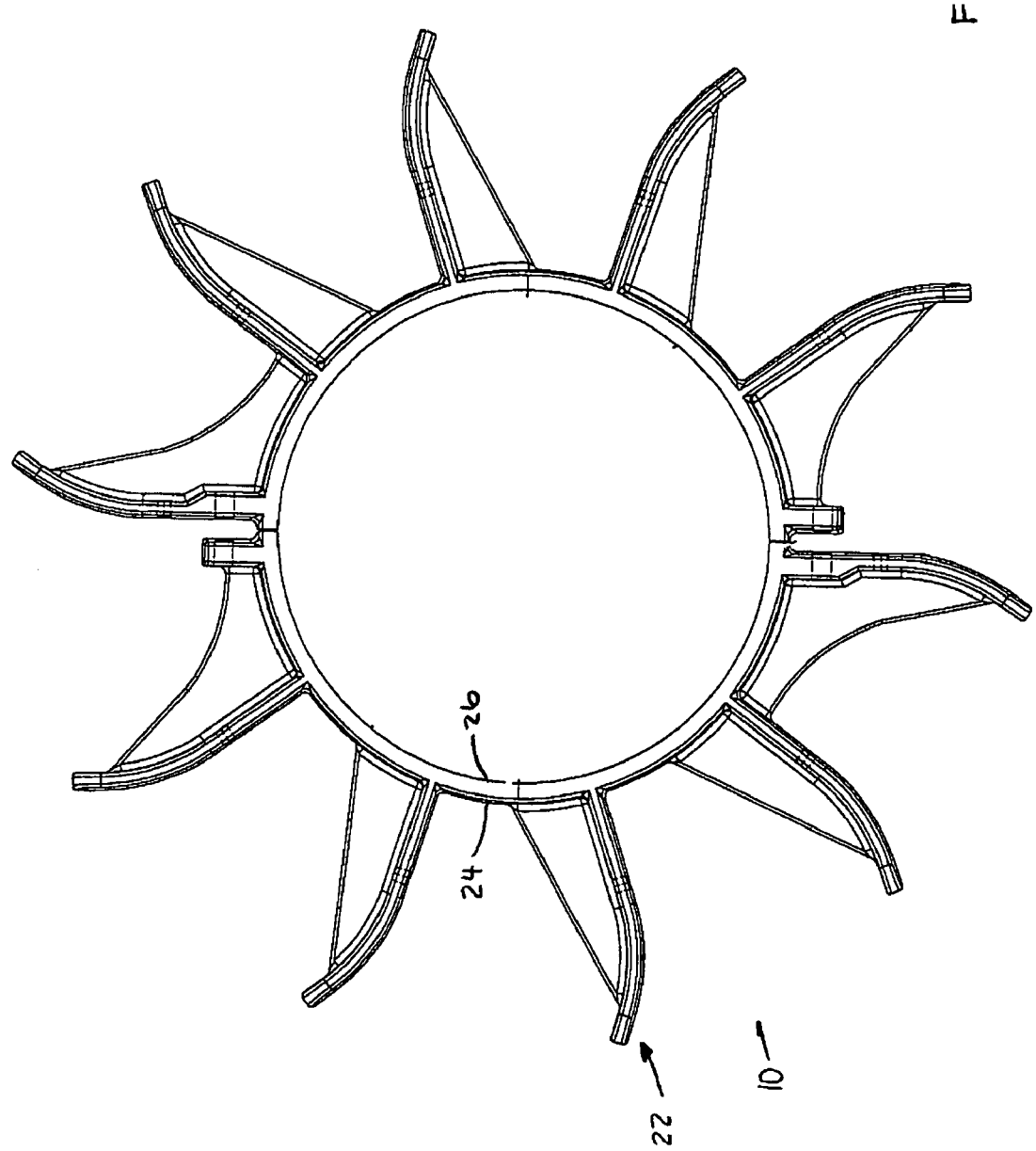
FIG. 5 of the drawings is side elevational view of a starwheel of the present invention.

The starwheel 10 is shown in FIGS. 4 and 5 as comprising central hub 20 and a plurality of paddle deflection limiting members, such as paddle deflection limiting member 22. The central hub 20 includes an outer perimeter surface 24 and an inner perimeter surface 26. Typically, the thickness of the central hub is approximately 1 inches and the central hub has a width of approximately 4 inches. It is contemplated that the starwheel may comprise a single circular member, or may comprise two arcuate members each having an arcuate distance of 180° (FIG. 5). In other embodiments, the starwheel may comprise three or more arcuate members which are combined to make a full starwheel of 360°. In a typical application, the starwheel has a 37" diameter. It is contemplated that the starwheel comprises a cast steel member, while other metals, as well as composites are likewise contemplated.

Paddle deflection limiting members 22 are spaced about the central hub. With reference to FIG. 5, it is contemplated that a total of 10 paddle deflection limiting members may extend about the 360° of a starwheel. In certain embodiments, the starwheel comprises two central hub components, each having five paddle deflection limiting members spaced evenly therearound (FIG. 5). Of course, in other embodiments the starwheel may have fewer paddle deflection limiting members (such as between 4 and 9, etc.) or a greater quantity of paddle deflection limiting members (i.e., 11 or more). Inasmuch as it is contemplated that each of the paddle deflection limiting members are substantially structurally similar (although not required to be such), one paddle deflection limiting member will be described with the understanding that the remaining paddle deflection limiting members are structurally similar.

Each paddle deflection limiting member 22 is coupled to the central hub 20 at proximal end 30, and includes distal end 32 opposite proximal end 30. It is contemplated that the paddle deflection limiting member may be integrally cast with the central hub 20. Paddle deflection limiting member 22 further includes leading surface 34 and following surface 36 opposing the leading surface 34. The two surfaces are substantially uniform in configuration, thereby defining a paddle deflection limiting member which is substantially uniform in thickness. In other embodiments, such as the embodiment of FIG. 6, the configuration of the paddle deflection limiting member may be significantly arbitrary. Such a configuration will be described in greater detail below.

Referring again to FIG. 2, the leading surface of the paddle member spans the width of starwheel 10 and is substantially perpendicular to the rotation of the starwheel 10. Support web 38 is positioned on the side of the following surface 36 so as to enhance the strength of the paddle deflection limiting member. In certain embodiments, the thickness of the support member can be varied along the length thereof, and, likewise, the support web 38 may be eliminated from certain applications.

Paddle attachment assembly 40 is positioned between proximal end 30 and distal end 32. The paddle attachment assembly facilitates the coupling of scraper paddle 12 to leading surface 34. In the embodiment shown, the paddle attachment assembly comprises openings 51a, 51b (FIG. 2). Fasteners can be utilized to couple the paddle deflection limiting member and the scraper paddle 12. In other embodiments, the attachment assembly may comprise clamps, other types of fasteners, welds, among other structural members.

The paddle attachment assembly separates the paddle deflection limiting member into a first portion 42 which extends between the proximal end 30 and paddle attachment assembly 40, and a second portion 44 which extends between the paddle attachment assembly 40 and distal end 32. In the embodiment shown, the first portion 42 is substantially perpendicular to the surface of the central hub at the point of attachment and is substantially planar. In other embodiments, the first portion may be oblique to the tangent of the central hub, and may comprise a configuration which is other than substantially planar.

Figure 1:
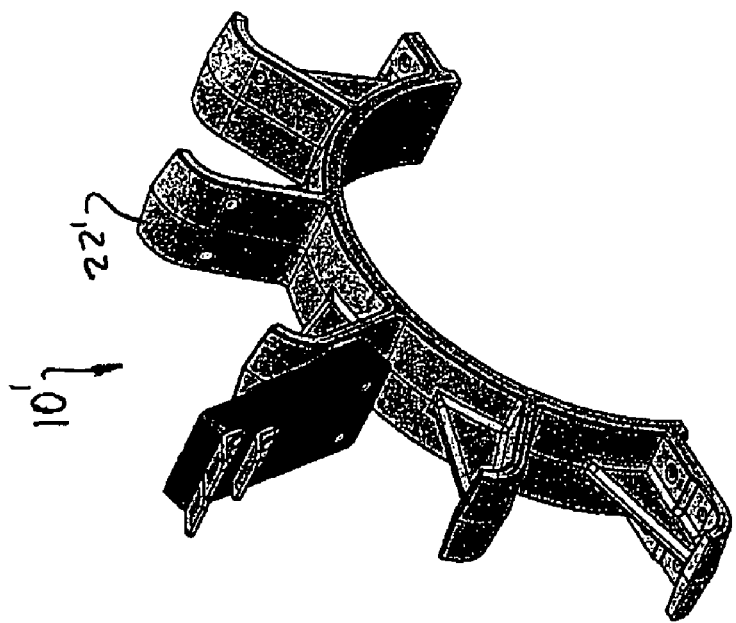
FIG. 1 of the drawings is a perspective view of a prior art starwheel assembly showing a scraper paddle positioned upon one of the paddle deflection limiting members.

The second portion 44 of the paddle deflection limiting member 22 comprises an arcuate configuration which supports scraper paddle 12. In particular, the arcuate configuration is of a substantially continuous uniform curvature, although such a configuration is not required. It is contemplated that the arcuate configuration may vary slightly in curvature along the length thereof. Preferably, the arcuate configuration is such that the radius of curvature, $r_s$, of the second portion 44 is at least 45% of the radius of curvature, $r_c$, of the central hub 20 of starwheel 10 or larger. More preferably, the radius of curvature, $r_s$, of the second portion is greater than 67% of the radius of curvature, $r_c$, of the central hub. By comparison, and with reference to FIG. 1, the radius of curvature, $r_s'$, of the prior art paddle deflection limiting member is substantially smaller. It is contemplated that the radius of curvature of the second portion is larger than the radius of curvature of the starwheel 10.

At or near the distal end, the second portion includes a deflection limiting region 57 which is defined as the limit of the deflection of the paddle under normal operating conditions. This deflection limiting region is spaced apart from the paddle attachment assembly a distance which is greater than 3.5", and more preferably 5" or greater. Such a configuration greatly enhances the durability of the paddles, while allowing the paddles to operate at optimum efficiency.

As is shown in FIG. 4, to provide adequate support, and to enhance the operation and operational life of the scraper paddles, line 100 which is tangent to the paddle deflection limiting member proximate the deflection limiting region is angled at an angle α of between 15° and 60° relative to line 110 tangent to the paddle deflection limiting member proximate the paddle attachment assembly. By comparison, the angle α' in the prior art embodiment of FIG. 3 is substantially greater. Thus, in an abutting configuration, the scraper paddle will substantially follow the paddle deflection limiting member.

Figure 6:
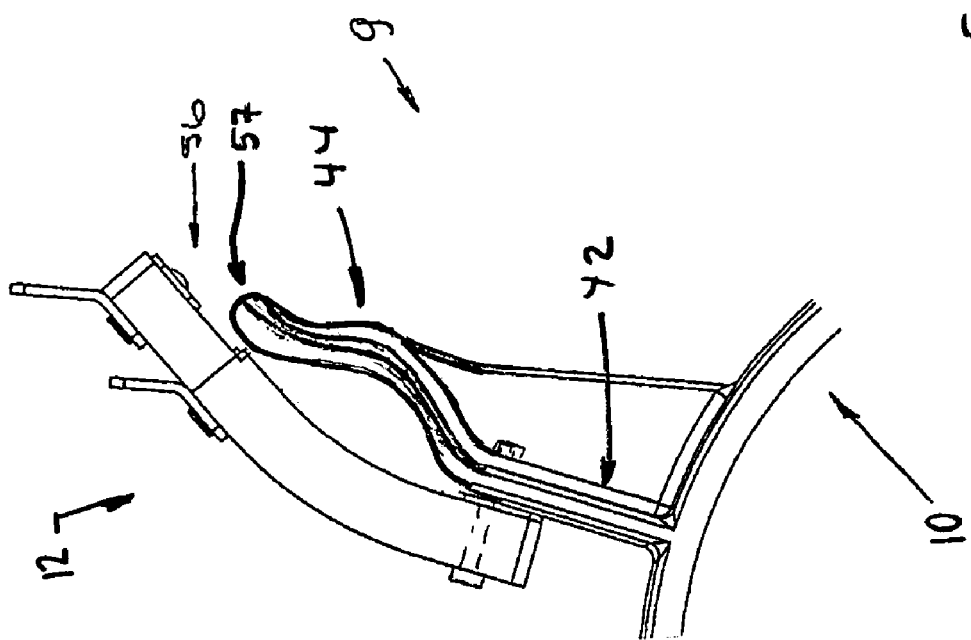
FIG. 6 of the drawings is a side elevational view of another embodiment of the starwheel, showing, in particular, an alternate configuration of the paddle deflection limiting member.

In the embodiment of FIG. 6, the second portion 44 is positioned so as to have limited contact with the paddle member between the paddle attachment assembly and the deflection limiting region. Other embodiments are contemplated wherein the second portion 44 has a configuration which is other than the continuous curved member shown in the preferred embodiment.

Scraper paddle 12 is shown in FIG. 4 as comprising proximal end 50, distal end 52, leading surface 64 and following surface 66. Following surface faces leading surface 34 of paddle deflection limiting member 22. Attachment interface 54 is between the proximal and distal ends of the scraper paddle. In the embodiment shown, the attachment interface comprises openings extending through the scraper paddle which coincide with the openings of the paddle deflection limiting member and fasteners which couple the two components together. In the embodiment shown, bolts and nuts comprise the fasteners that couple the two components together. A portion 56 of the scraper paddle overhangs over the distal end of the paddle deflection limiting member when the scraper paddle is pressed against the leading surface of the paddle deflection limiting member.

A plurality of blades, such as blade 60 are attached to the leading surface 64 of the scraper paddle. In the embodiment shown, outboard blades 60 are positioned proximate the distal end 52 of the scraper paddle, and inboard blades 62 are positioned below the outboard blades. Of course, greater or fewer blades may be utilized, depending on the particular use and application thereof.

A typical scraper has a body length of approximately 9" and the region extending away from the paddle attachment assembly is typically approximately 8" in length. The use of blades extending from the body add an additional approximate 1" inches in length. The scraper paddle 12 is configured such that the second portion 44 of the paddle deflection limiting member is at least 60% of the length of a scraper paddle which is beyond the attachment assembly. Most preferably, overhang 56 comprises less than 40% of the overall length of the scraper paddle beyond the attachment assembly, and more preferably approximately 25 to 30% thereof. Additionally, the ratio of the length of the scraper paddle extending beyond the paddle attachment assembly and the distance between the paddle attachment assembly and the deflection limiting region is less than 2.4. When the scraper paddle is forced fully against the paddle deflection limiting member 22, the deflection of overhanging 56 of the scraper paddle is limited due to the portion extending beyond the deflection limiting region. It has been found that the particular configuration of the paddle deflection limiting member as well as the configuration of the scraper paddle relative to the support member results in an effective operation of the blades of the scraper paddle, while precluding undue degradation of the scraper paddles themselves.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A starwheel apparatus for use with a carcass dehairing machine comprising:
    a central hub having an arcuate body with an outer surface and an inner surface;
    at lease one paddle deflection limiting member having a proximal end coupled to the outer surface of the body of the central hub, a distal end opposing the proximal end, a deflection limiting region approaching the distal end, a paddle attachment assembly facilitating attachment of a scraper paddle thereto, the portion of the at least one paddle deflection limiting member extending between the paddle attachment assembly and the deflection limiting region comprising a configuration which is at least 50% of the length of a portion of a scraper paddle attached thereto beyond the paddle attachment assembly.

2. The starwheel apparatus of claim 1 wherein the arcuate body comprises a substantially circular member having an arcuate distance of 360°, and the at least one paddle deflection limiting member comprises ten paddle deflection limiting members disposed substantially equidistantly about the outside surface of the arcuate body.

3. The starwheel apparatus of claim 2 wherein the arcuate body is separable into two components, each having an arcuate distance of approximately 180°.

4. The starwheel apparatus of claim 2 wherein the at least one paddle deflection limiting member further comprises a substantially continuous arcuate configuration extending substantially from the paddle attachment assembly to the distal end thereof.

5. The starwheel apparatus of claim 1 wherein the at least one paddle deflection limiting member further comprises a substantially planar outer surface between the paddle attachment assembly and the proximal end.

6. The starwheel apparatus of claim 5 wherein the at least one paddle deflection limiting member further comprises a substantially continuous arcuate configuration extending substantially from the paddle attachment assembly to the distal end thereof, wherein a final contact portion of the scraper in operation is defined as the deflection limiting region.

7. The starwheel apparatus of claim 1 wherein a line tangent to the paddle deflection limiting member proximate a deflection limiting region thereof is angled at an angle α of between 15° and 60° relative to a line tangent to the paddle deflection limiting member proximate the paddle attachment assembly thereof.

8. The starwheel apparatus of claim 1 wherein less than 40% of the length of a scraper paddle beyond the paddle attachment assembly extends beyond the deflection limiting region of the at least one paddle deflection limiting member.

9. The starwheel apparatus of claim 1 wherein the at least one paddle deflection limiting member includes an arcuate configuration having a radius of curvature which is at least 45% that of the radius of curvature of the arcuate body of the central hub.

10. The starwheel apparatus of claim 9 wherein the radius of curvature of the arcuate configuration is greater than 67% of the radius of curvature of the arcuate body of the central hub.

11. A starwheel apparatus for use in association with a carcass dehairing machine comprising:
   a central hub having an arcuate body with an outer surface and an inner surface;
   at lease one paddle deflection limiting member having a proximal end coupled to the outer surface of the body of the central hub, a distal end opposing the proximal end and a deflection limiting region approaching the distal end, a paddle attachment assembly facilitating attachment of a scraper paddle thereto, the portion of the at least one paddle deflection limiting member extending between the paddle attachment assembly and the deflection limiting region structurally configured such that a line tangent to the paddle deflection limiting member proximate the deflection limiting region thereof is angled at an angle α of between 15° and 60° relative to a line tangent to the paddle deflection limiting member proximate the paddle attachment assembly.

12. The starwheel apparatus of claim 11 wherein the arcuate body comprises a substantially circular member having an arcuate distance of 360°, and the at least one paddle deflection limiting member comprises ten paddle deflection limiting members disposed substantially equidistantly about the outside surface of the arcuate body.

13. The starwheel apparatus of claim 11 wherein the at least one paddle deflection limiting member further comprises a substantially planar outer surface between the paddle attachment assembly and the proximal end.

14. The starwheel apparatus of claim 11 wherein less than a 40% of the length of a scraper paddle beyond the paddle attachment assembly extends beyond the deflection limiting region of the at least one paddle deflection limiting member.

15. The starwheel apparatus of claim 11 wherein the at least one paddle deflection limiting member includes an arcuate configuration having a radius of curvature which at least 45% of the radius of curvature of the arcuate body of the central hub.

16. A system for use with carcass dehairing machines comprising:
   a starwheel apparatus comprising:
      a central hub having an arcuate body with an outer surface and an inner surface;
      at lease one paddle deflection limiting member having a proximal end coupled to the outer surface of the body of the central hub, a distal end opposing the proximal end, a deflection limiting region approaching the distal end, and a paddle attachment assembly associated therewith;
   a scraper paddle coupled to each of the at least one paddle deflection limiting member by way of the paddle attachment assembly, the scraper paddle being sized so as to extend beyond the deflection limiting region of the at least one paddle deflection limiting member,
   wherein the at least one paddle deflection limiting member and the scraper paddle are structurally configured such that the deflection limiting region more than 3.5" inches beyond the attachment assembly of the paddle deflection limiting member beyond the attachment interface thereof.

17. The system of claim 16 wherein the scraper paddle is greater than 8" in length.

18. The system of claim 16 wherein the distal end of the scraper paddle includes a plurality of blades extending therethrough.

19. The system of claim 16 wherein at one blade is positioned so as to overlie a portion of the distal end of the at least one paddle deflection limiting member.

20. The system of claim 16 wherein the ratio of the length of the scraper paddle extending beyond the paddle attachment assembly and the distance between the paddle attachment assembly and the deflection limiting region is less than 2.4.

* * * * *